United States Patent
Cho et al.

(10) Patent No.: US 8,866,741 B2
(45) Date of Patent: Oct. 21, 2014

(54) METHOD, MEDIUM AND APPARATUS FOR BROWSING IMAGES

(75) Inventors: Sung-jung Cho, Seongnam-si (KR); Chang-kyu Choi, Yongin-si (KR); Kwang-hyeon Lee, Yongin-si (KR); Yeun-bae Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/406,082

(22) Filed: Feb. 27, 2012

(65) Prior Publication Data

US 2012/0154271 A1    Jun. 21, 2012

Related U.S. Application Data

(63) Continuation of application No. 11/797,493, filed on May 3, 2007, now Pat. No. 8,149,214.

(30) Foreign Application Priority Data

May 30, 2006    (KR) .......................... 10-2006-0048981

(51) Int. Cl.
*G06F 3/033* (2013.01)
*G06F 1/16* (2006.01)
*G06F 17/30* (2006.01)

(52) U.S. Cl.
CPC ........ *G06F 17/30274* (2013.01); *G06F 1/1626* (2013.01); *G06F 1/1694* (2013.01); *G06F 2200/1637* (2013.01)
USPC ........................................... 345/158; 345/684

(58) Field of Classification Search
CPC .................................. G06F 3/033; G06F 3/14
USPC .......................................................... 345/158
See application file for complete search history.

(56) References Cited

U.S. PATENT DOCUMENTS

| | | | |
|---|---|---|---|
| 5,602,566 A | 2/1997 | Motosyuku et al. | 345/684 |
| 7,152,210 B1 * | 12/2006 | Van Den Hoven et al. | 715/723 |
| 2002/0175896 A1 * | 11/2002 | Vaananen et al. | 345/158 |
| 2004/0135770 A1 | 7/2004 | Hayasaka | 345/156 |
| 2005/0208978 A1 | 9/2005 | Pylkko | |
| 2005/0222802 A1 | 10/2005 | Tamura et al. | 702/150 |
| 2007/0150830 A1 * | 6/2007 | Ording et al. | 715/784 |

FOREIGN PATENT DOCUMENTS

| | | |
|---|---|---|
| EP | 1583333 A2 | 3/2005 |
| EP | 1583333 A3 | 3/2007 |
| JP | 2004-120514 | 4/2004 |
| KR | 10-2005-0005536 | 1/2005 |

(Continued)

OTHER PUBLICATIONS

Korean Office Action in U.S. Parent application for corresponding Korean Patent Application No. 10-2006-0048981 dated Apr. 17, 2007.

(Continued)

*Primary Examiner* — William Boddie
*Assistant Examiner* — Sahlu Okebato
(74) *Attorney, Agent, or Firm* — Staas & Halsey LLP

(57) ABSTRACT

A method, medium and apparatus browsing images is disclosed. The method browsing images includes sensing acceleration imparted to a portable digital device, and moving an image onto a display area in accordance with a tilt angle of the portable digital device if the sensed acceleration is greater than a first threshold value.

22 Claims, 13 Drawing Sheets

(56) References Cited

FOREIGN PATENT DOCUMENTS

| KR | 10-2005-0060923 | 6/2005 |
|---|---|---|
| KR | 10-2005-0068663 | 7/2005 |
| KR | 10-2006-0003471 | 1/2006 |
| WO | WO 98/14863 | 4/1998 |
| WO | WO 9814863 A2 * | 4/1998 |
| WO | WO01/86920 | 11/2001 |

OTHER PUBLICATIONS

A. Singh, "The PowerBook Sudden Motion Sensor", http://web.archive.org/web/20060221132358/http://www.kernelthread.com/software/ams/ams.html, 1994-2006, 1-10 pgs (in English).

A. Singh, "The Apple Motion Sensor As a Human Interface Device", http://web.archive.org/web/20060614064846/http://www.kernelthread.com/softward/ams2hid/ams2hid.html, 1994-2006, 1-11 pgs (in English).

European Search Report for corresponding European Patent Application No. EP07108694 dated Aug. 27, 2007, pp. 6 (in English).

Chinese Office Action for corresponding Chinese Patent Application No. 2007101046981 dated Sep. 5, 2008 (5 pgs).

Korean Office Action for corresponding Korean Patent Application No. 10-2006-0048981 dated Sep. 18, 2007.

Korean Office Action for corresponding Korean Patent Application No. 10-2006-0048981 dated Apr. 17, 2007.

Notice of Allowance mailed Nov. 25, 2011 in U.S. Appl. No. 11/797,493.

Supplemental Notice of Allowability mailed Jan. 31, 2012 in U.S. Appl. No. 11/797,493.

U.S. Office Action mailed May 17, 2010 in U.S. Appl. No. 11/797,493.

U.S. Office Action mailed Jun. 1, 2011 in U.S. Appl. No. 11/797,493.

* cited by examiner

METHOD, MEDIUM AND APPARATUS FOR BROWSING IMAGES

CROSS-REFERENCE TO RELATED APPLICATIONS

This application is a continuation of U.S. Ser. No. 11/797,493, filed May 3, 2007 now U.S. Pat. No. 8,149,214, the disclosure of which is incorporated herein in its entirety by reference. This application claims priority from Korean Patent Application No. 10-2006-0048981 filed on May 30, 2006 in the Korean Intellectual Property Office, the disclosure of which is incorporated herein by reference in its entirety.

BACKGROUND

1. Field

One or more embodiments of the present invention relate to an image browsing method, medium and apparatus and, more particularly, to a method, medium and apparatus browsing images using a tilt angle of a portable digital device.

2. Description of the Related Art

Due to the widespread use of portable digital devices such as cellular phones, digital cameras, portable multimedia players (PMPs), and personal digital assistants (PDAs), portable digital devices are commonly provided with enhanced performance for a variety of functions. Particularly, as the storage capacity of portable digital devices has increased to meet the demand for various multimedia content, large amounts of multimedia content may be stored.

As a result, it is necessary to use a predetermined screen and a button to browse the large amount of multimedia content with the portable multimedia devices. Particularly, since digital cameras or PMPs can store images and photographs, it is common for a user to browse through the images using the predetermined screen and the button.

In this respect, a technique for browsing images more conveniently in a portable multimedia device is desired. However, since portable multimedia devices are becoming smaller, there are a number of difficulties in providing a sufficient quantity of buttons to perform the variety of device tasks. For this reason, other viable techniques for browsing images are needed.

SUMMARY

Accordingly, one or more embodiments of the present invention have been made to solve the above-mentioned problems, and an aspect of the present invention is to provide a method, medium and apparatus for browsing images using a tilt angle of a portable digital device without the need to manipulate buttons.

Additional aspects and/or advantages of the invention will be set forth in part in the description which follows and, in part, will be apparent from the description, or may be learned by practice of the invention.

In an aspect of the present invention, there is provided a method of browsing images. The method includes sensing acceleration imparted to a portable digital device, and moving an image onto a display area in accordance with a tilt angle of the portable digital device if the sensed acceleration is greater than a first threshold value.

In another aspect of the present invention, there is provided an apparatus for browsing images. The apparatus includes a sensor unit to sense acceleration imparted to a portable digital device, and a screen management unit to move an image onto a display area in accordance with a tilt angle of the portable digital device if the sensed acceleration is greater than a first threshold value.

In another aspect of the present invention, there is provided an image browsing method including measuring a tilt angle of a portable device, and moving an image onto a display of the portable device, according to the measured tilt angle.

BRIEF DESCRIPTION OF THE DRAWINGS

These and/or other aspects and advantages of the invention will become apparent and more readily appreciated from the following description of embodiments, taken in conjunction with the accompanying drawings of which.

DETAILED DESCRIPTION OF EMBODIMENTS

Figure 1:
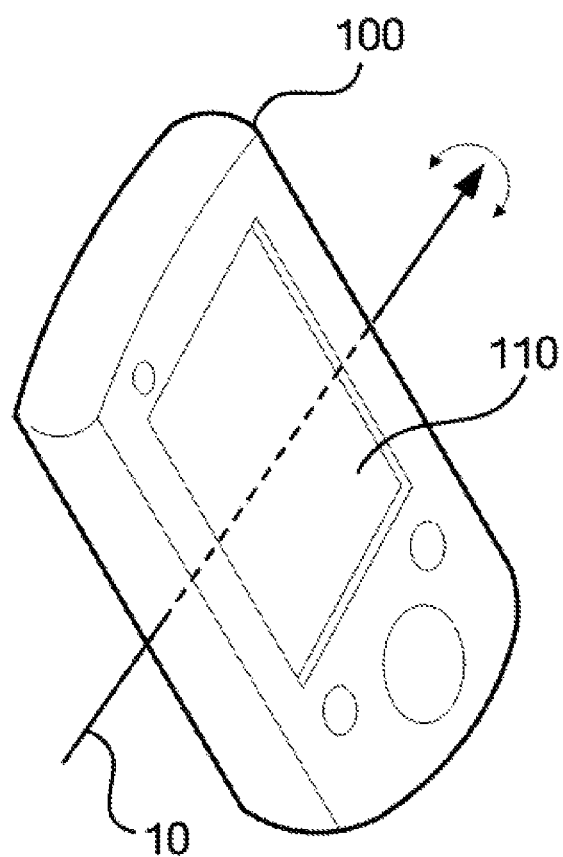
FIG. 1 illustrates a portable digital device, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a portable digital device 100 according to an embodiment of the present invention. When the portable digital device 100 is operated in an image browsing mode, a user may tilt the portable digital device 100 in a predetermined direction to change a display area of an image on a screen 110 of the portable digital device 100. In other words, images may be sequentially displayed on the screen 110 in accordance with a tilt angle of the portable digital device 100 as shown in FIGS. 2A and 2B.

Figure 2A:
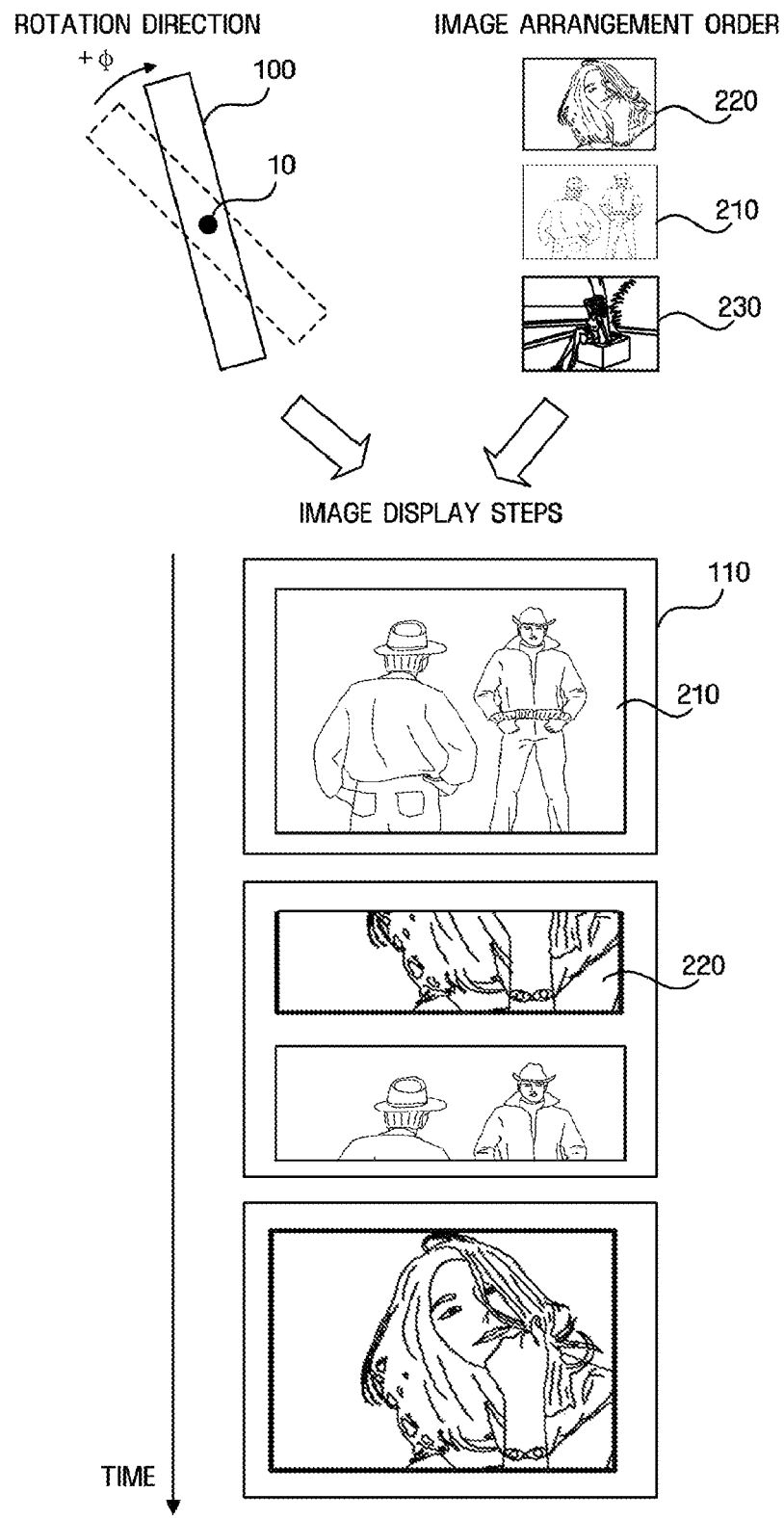
FIGS. 2A and 2B illustrate the browsing of images, according to an embodiment of the present invention.

As shown in FIG. 2A, if the portable digital device 100 is rotated at $+\phi$ around a reference axis 10, a first image 210 displayed on the screen 110 of the portable digital device 100 may move in a downward direction of the screen 110. As the first image 210 moves toward the bottom of the screen 110, a second image 220 adjacent to the first image 210 appears on the screen 110 so as to be displayed.

Figure 2B:
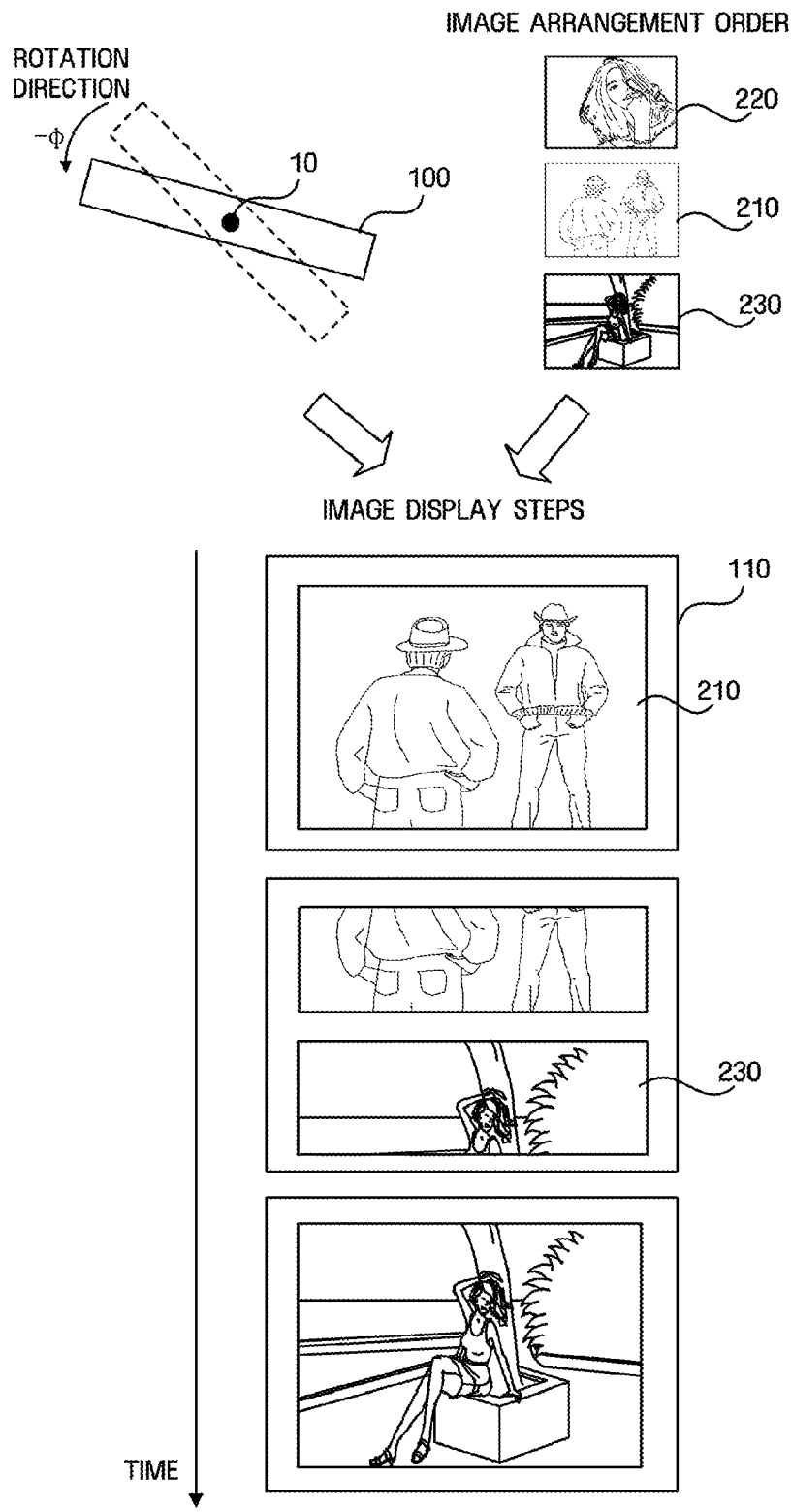

Also, as shown in FIG. 2B, if the portable digital device 100 is rotated at −φ around the reference axis 10, the first image 210 displayed on the screen 110 of the portable digital device 100 may move in a downward direction of the screen 110. Again, as the first image 210 moves toward the bottom of the screen 110, a third image 230 adjacent to the first image 210 appears on the screen 110, so as to be displayed.

An apparatus browsing images in accordance with motion of the portable digital device 100 will be described.

Figure 3:
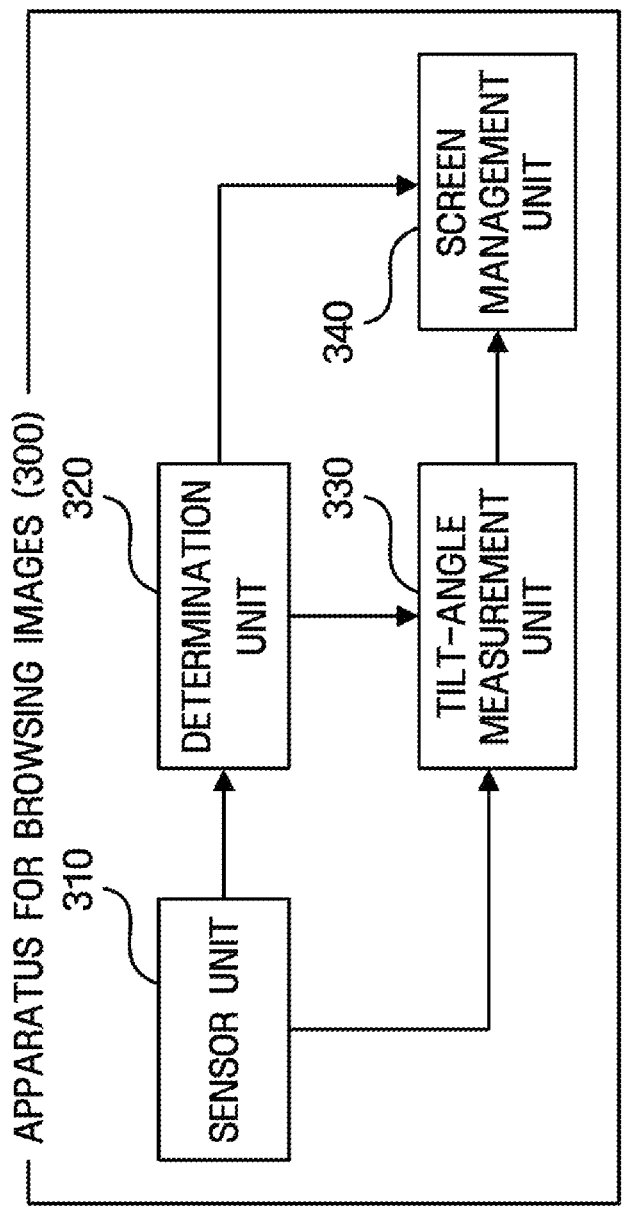
FIG. 3 illustrates an apparatus for browsing images, according to an embodiment of the present invention.

FIG. 3 illustrates an apparatus 300 browsing images, according to an embodiment of the present invention. The apparatus 300 shown in FIG. 3 may include a sensor unit 310, a determination unit 320, a tilt angle measurement unit 330, and a screen management unit 340, for example, although different and additional units may be used. The apparatus 300 may be included in the aforementioned portable digital device 100.

Figure 4:
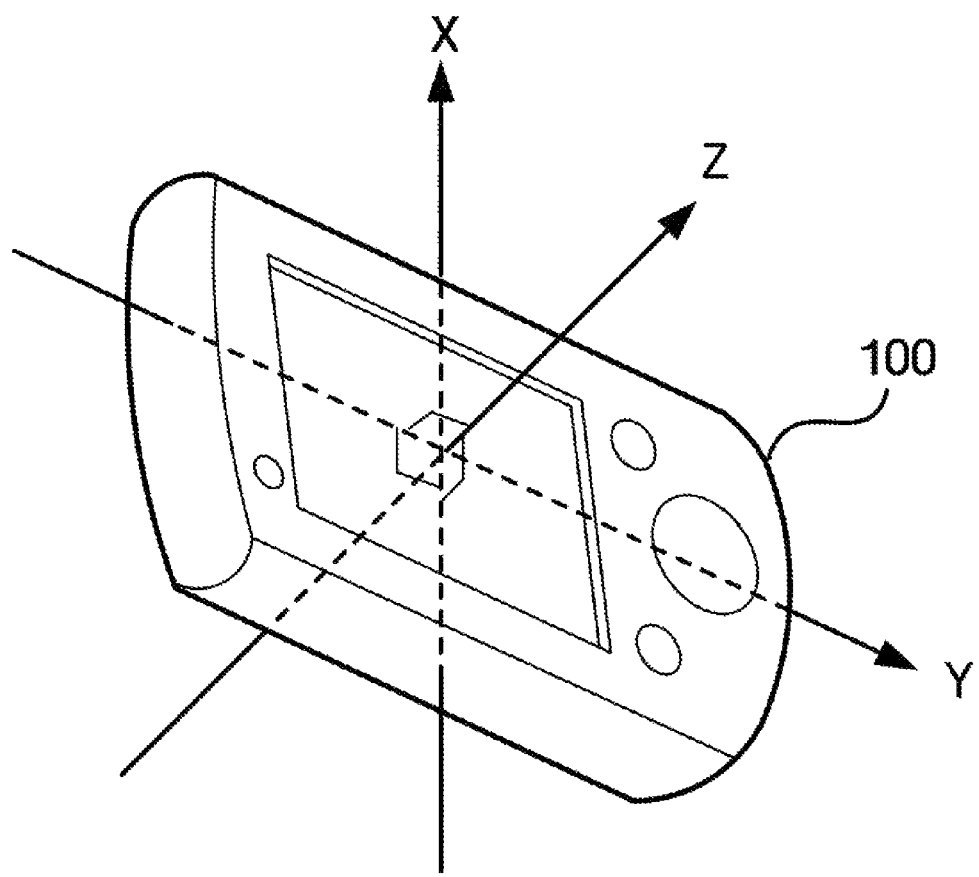
FIG. 4 illustrates a reference axis, according to an embodiment of the present invention.

The sensor unit 310 may sense motion of the portable digital device 100, generated as a user grasps the device 100. In more detail, the sensor unit 310 may sense acceleration given in at least one direction with respect to the portable digital device 100. For the purpose, the sensor unit 310 may include at least one acceleration sensor. In another embodiment, the sensor unit 310 may include three acceleration sensors (not shown) provided in three reference axes (x, y, and z axes), orthogonal to one another as shown in FIG. 4.

The determination unit 320 may determine whether motion of the portable digital device 100 affects the motion of images in accordance with the value of the acceleration given to the device 100, for example. In more detail, if the value of the acceleration given to the device 100 is greater than a first threshold value, the determination unit 320 may allow the screen management unit 340 to control the motion of the images on the screen 110, by reflecting the motion of the device 100. However, if the value of the acceleration given to the device 100 is not greater than a first threshold value, the determination unit 320 may not allow the screen management unit 340 to reflect motion of the portable digital device 100 in the motion of the images.

The value of the acceleration given to the portable digital device 100 may be calculated by incorporation of acceleration measured with respect to each reference axis. For example, if the acceleration measured in three reference axes vertical to one another as shown in FIG. 4 is respectively expressed as $a_x$, $a_y$, and $a_z$, the value A of the acceleration given to the portable digital device can be expressed as the following equation 1.

$$A = \sqrt{a_x^2 + a_y^2 + a_z^2}$$ Equation 1

The size A has a value of 9.8 m/s² corresponding to gravity acceleration in a state where no force is applied to the device 100. However, if a force is applied to the device 100, positive acceleration or negative acceleration may be added to at least one reference axis, whereby the size A has a value of (9.8+α) m/s². Here, if a force is forcibly applied to a browse size and image of a generated by a user's unintended motion (caused by, for example, trembling or inadvertent shaking), the size of a is calculated through a previous experiment, whereby a proper value of the first threshold value may be set.

In general, the value of the acceleration given to the device 100 by a force forcibly applied by the user to browse images is greater than the value of the acceleration imparted to the portable digital device 100 by the trembling or inadvertent shaking of the user. Accordingly, the determination unit 320 acts to avoid image panning on the screen 110 due to any unintended motion of the device 100 by the user.

The tilt angle measurement unit 330 may measure a tilt angle of the portable digital device around a predetermined reference axis, for example. The tilt angle of the portable digital device 100 may be calculated through a variation of between gravity acceleration components sensed by the sensor unit 310, with respect to the predetermined reference axis. The tilt angle of the device 100 may be measured using a gyroscope or a micro electro-mechanical system (MEMS) acceleration sensor, for example. Accordingly, the apparatus 300 may include a single functional block obtained by incorporating the sensor 310 and the tilt angle measurement unit 330 into one.

The screen management unit 340 may control the motion of the images on the screen 110 of the device 100 in accordance with a rotation direction of the device 100, and its tilt angle. Motion of the images by the screen management unit 340 is as shown in FIGS. 2A and 2B. In addition, motion of the images may be realized variously in accordance with the rotation direction of the device 100 and the motion direction of the images on the screen 110.

The screen management unit 340 may control the motion of the images in accordance with three situations, for example. In other words, the three situations may include the case where the tilt angle of the device 100 is smaller than a certain size, the case where the motion of the device 100 is stopped, and the case where the tilt angle of the device 100 is greater than a certain size. Hereinafter, the screen management unit 340 will be described in greater detail with reference to FIGS. 5 to 13.

Figure 5:
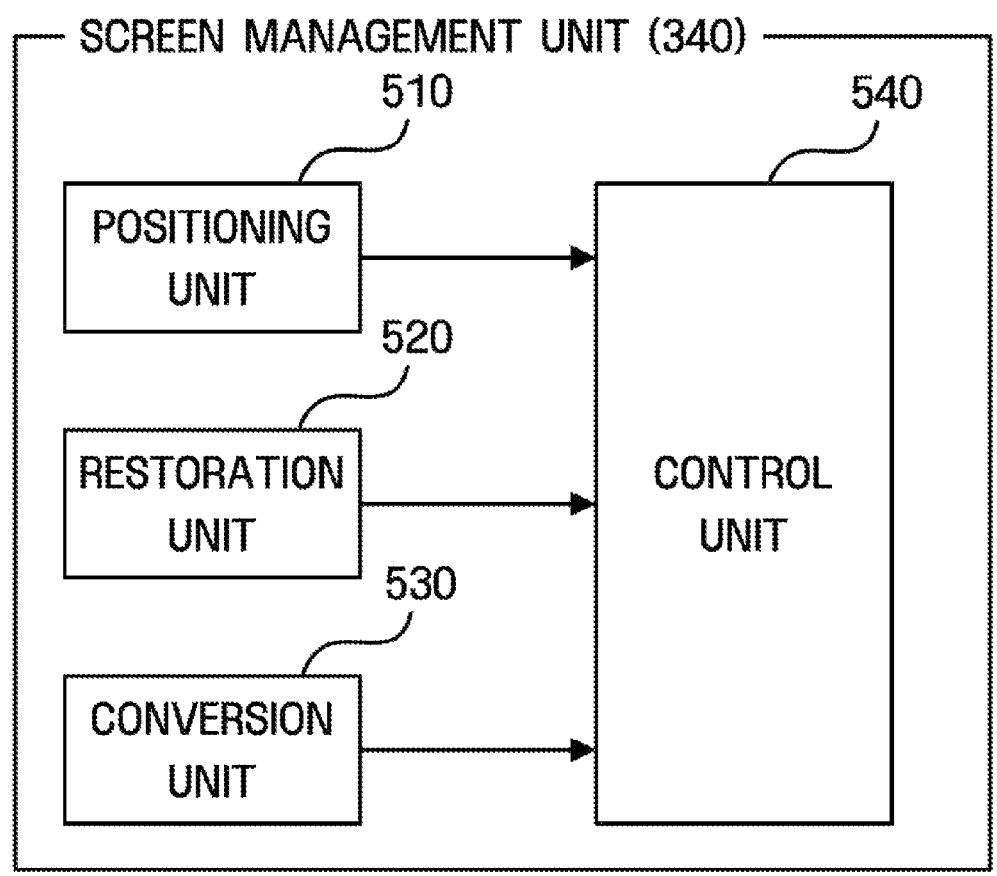
FIG. 5 illustrates a screen management unit, according to an embodiment of the present invention.

FIG. 5 illustrates the screen management unit 340, according to an embodiment of the present invention. The screen management unit 340 shown in FIG. 5 may include a positioning unit 510, a restoration unit 520, a conversion unit 530, and a control unit 540, for example, although different and additional units may be used.

The positioning unit 510 may determine a position of an image corresponding to a current control target on the screen 110 in accordance with the tilt angle measured by the tilt angle measurement unit 330. If the tilt angle of the device 100 is large, the motion (motion distance) of the image on the screen 110 is commensurately increased.

In an embodiment, the position variation of the image is proportionate to the tilt angle. In other words, the image displacement is great if the tilt angle becomes great, and the image displacement is small if the tilt angle becomes small. Thus, it is possible to reflect the user's intention to control the motion of the image if the tilt angle is great. In other words, if an absolute size of the tilt angle is less than a certain level, even though the tilt angle of the device 100 is greater than the first threshold value, it is assumed that the user does not intend to move an adjacent image onto the screen in place of a current image, but rather that the user intends to pan the current image. Accordingly, the screen position variation may become small for a small tilt angle while the screen position variation may become larger for a larger tilt angle. At the same time, unnecessary motion of the image on the screen 110, due to any unintended motion (for example, trembling or inadvertent shaking) of the user, may be avoided by the determination unit 320, and motion of the image may be maintained stable.

Figure 6:
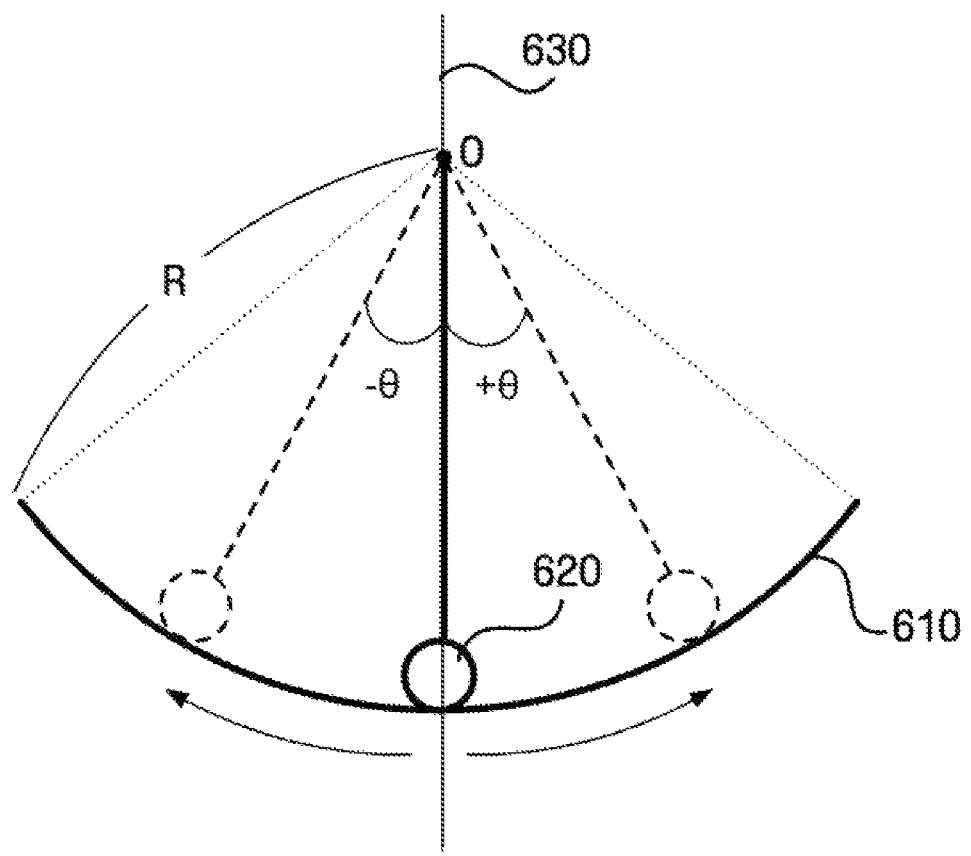
FIG. 6 illustrates a screen control mode, according to an embodiment of the present invention.

The positioning unit 510 determines the position of the image on the screen according to the user's tilt motion, and may calculate position control according to the tilt motion to provide the user with intuitiveness and reality, akin to the motion of a moving ball in a bowl. For example, suppose a ball 620 exists in a bowl 610 having a radius of R as shown in FIG. 6. Here, the ball 620 corresponds to a center point of the image, and the bowl 610 corresponds to the screen 110.

Motion of the ball 620 is determined by an angle between a segment from the current position of the ball 620 to a central point O of the bowl and a reference segment 630, wherein the angle is referred as an intermediate angle and expressed as θ in FIG. 6. If the intermediate angle is equal to 0, then the central point of the image is positioned in the central point of the screen 110.

Since it is supposed that the ball 620 corresponds to the central point of the image, the intermediate angle is a parameter that determines an amount of movement of the image. For example, if the motion distance of the ball 620 on the bowl 610 corresponds to the amount of movement of the image, the amount of movement of the image can be determined as Rθ.

The intermediate angle according to the tilt angle of the portable digital device 100 can be obtained by the following equation 2.

$$\theta_1 = f_1(\gamma) \qquad \text{Equation 2}$$

Figure 7:
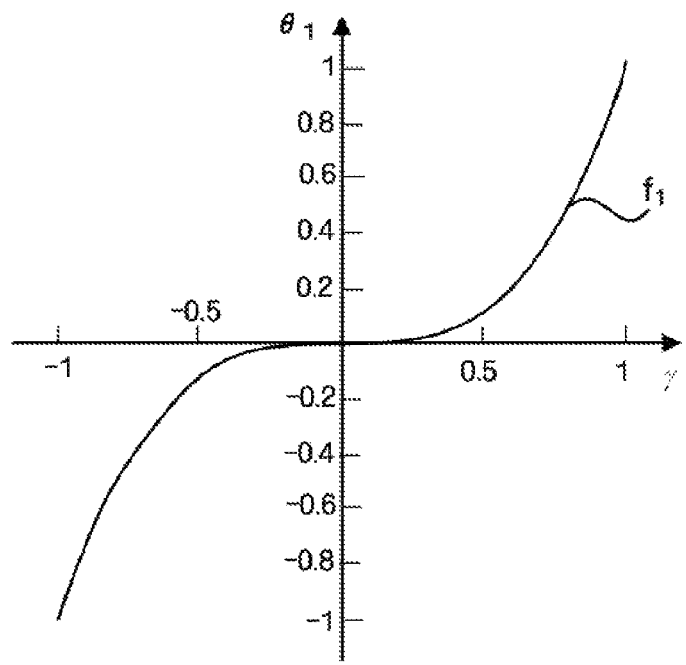
FIG. 7 illustrates a screen control function, according to an embodiment of the present invention.

In equation 2, γ is the tilt angle, and $\theta_1$ is the intermediate angle to be obtained. Also, $f_1$ is a predetermined function representing the relation between the tilt angle and the intermediate angle. As described above, since in an embodiment the position variation of the image becomes great if the tilt angle becomes great, $f_1$ is a function that can reflect such a condition. A graph representing an example of $f_1$ is shown in FIG. 7. According to the function $f_1$, an increase rate of an absolute value of the intermediate value $\theta_1$ increases if the absolute value of the tilt angle γ becomes great, while the increase rate of the absolute value of the intermediate value $\theta_1$ decreases as the tilt angle γ approaches zero. In this case, position variation may be decreased, or even disabled when the tilt angle becomes small, so that unwanted oscillation of the screen image may be prevented.

Referring again to FIG. 5, the restoration unit 520 may determine the position of the image to restore the image to the central position of the screen 110 if there is no change in the tilt angle of the device 100. Here, the user may view the image on the central position of the screen 110 by simply grasping the device 100 without any additional tilting motion for restoring the image. When motion of the image is controlled by the restoration unit 520, the image is moved closer to the central point of the screen 110 as time elapses from the point when there is no variation in the tilt angle, for example. Also, the image approaches the central point of the screen 110 in a shorter period when the distance between the central point of the image and the central point of the screen 110 is small, and there is no variation in the tilt angle.

To illustrate embodiments of the present invention, the intermediate angle determined by the restoration unit 520 may be expressed as equation 3 using the concept shown in FIG. 6.

$$\theta_2 = f_2(t_a, \theta_a) \qquad \text{Equation 3}$$

Figure 8:
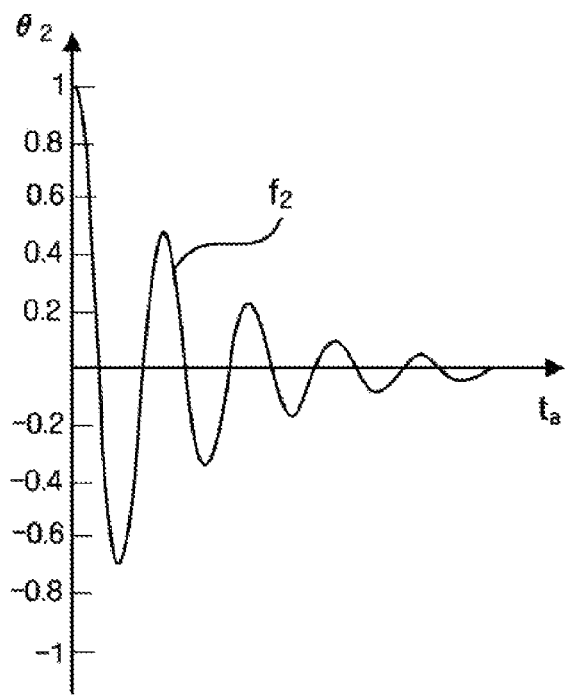
FIG. 8 illustrates another screen control function, according to an embodiment of the present invention.

In equation 3, $\theta_2$ is the intermediate angle to be obtained, $t_a$ is the time elapsed from the point when there is no variation in the tilt angle to the current time, and $\theta_a$ is the intermediate angle at the time when there is no variation in the tilt angle. Also, $f_2$ is a function that determines the intermediate angle, and its example is shown in FIG. 8. As shown in FIG. 8, according to the function $f_2$, $\theta_2$ becomes close to the central point 0 as the time $t_a$ increases. Meanwhile, in FIG. 8, $\theta_a$ is equal to 1 at the time ($t_a=0$) when there is no variation in the tilt angle. If $\theta_a$ has a smaller value, a start position of a graph in FIG. 8 becomes lower and the time when the intermediate angle $\theta_2$ approaches 0 becomes shorter, for example.

Figure 9:
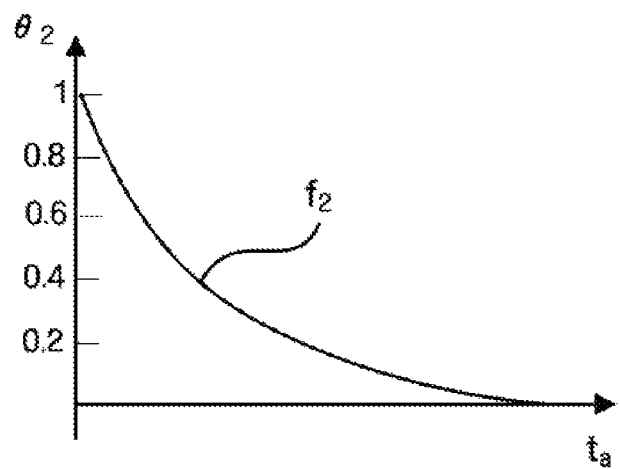
FIG. 9 illustrates another screen control function, according to an embodiment of the present invention.

Meanwhile, according to the embodiment shown in FIG. 8, the image oscillates in an up and down direction around the central point of the screen 110. The oscillation width of the image narrows as time passes. The graph of FIG. 8 is shown as an example, although the present invention is not limited to the example of FIG. 8. For example, the image may gradually be close to the central point of the screen without oscillation as shown in FIG. 9. In an embodiment, the image position is oscillated, as shown in FIG. 8, to allow the user to feel a physical object during motion control of the image.

Referring to FIG. 5 again, the conversion unit 530 may convert the control target into a next image if the tilt angle exceeds a second threshold value, for example. If the control target is converted, the conversion unit 530 may determine the position of the image to allow a new image, newly selected as the control target, to move toward the center of the screen 110. In an embodiment, if time passes while the control target is converted, the new image is placed close to the mid-point of the screen 110.

To illustrate embodiments of the present invention, the intermediate angle may be expressed as equation 4, using the concept shown in FIG. 6.

$$\theta_3 = f_3(t_b) \qquad \text{Equation 4}$$

Figure 10:
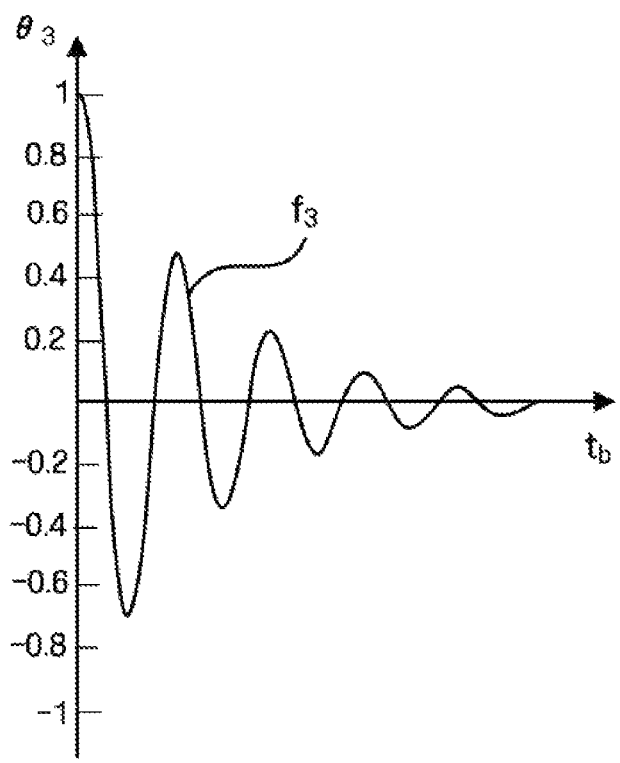
FIG. 10 illustrates another screen control function, according to an embodiment of the present invention.

In equation 4, $\theta_3$ is the intermediate angle to be obtained, and $t_b$ is the time elapsed from the point when the control target is converted. Also, $f_3$ is a function that determines the intermediate angle, and its example is shown in FIG. 10. As shown in FIG. 10, according to the function $f_3$, $\theta_3$ approaches 0 as the time $t_b$ increases.

Meanwhile, according to the embodiment shown in FIG. 10, the image oscillates in an up and down direction around the midpoint of the screen 110. The oscillation width of the image decreases as time passes. The graph of FIG. 10 is shown as an example, although the present invention is not limited to the example of FIG. 10. For example, the image can be close to the mid-point of the screen 110 without oscillation similar to $f_2$ shown in FIG. 9.

The control unit 540 may control motion of the image on the screen 110 according to the position of the image determined by the positioning unit 510, the restoration unit 520 and the conversion unit 530, for example. The control unit 540 may control motion of the image by giving a predetermined weight value to information provided from the positioning unit 510, the restoration unit 520 and the conversion unit 530 and synthesizing the information having the predetermined weight value.

Figure 11A:
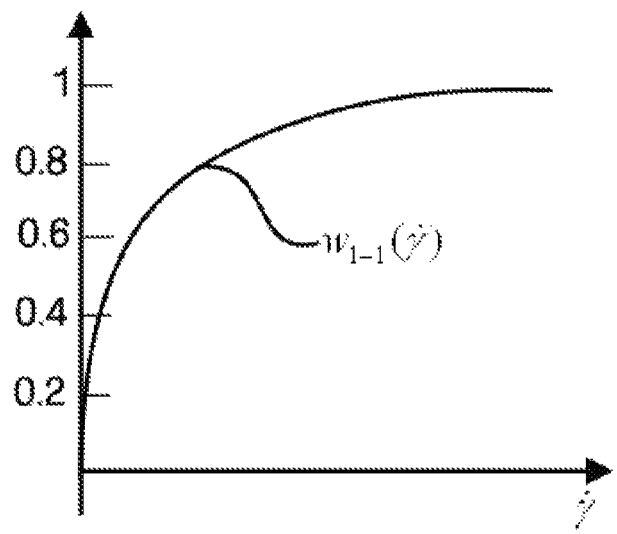
FIGS. 11A to 11D illustrate weight values of screen control functions, according to an embodiment of the present invention.
Figure 11B:
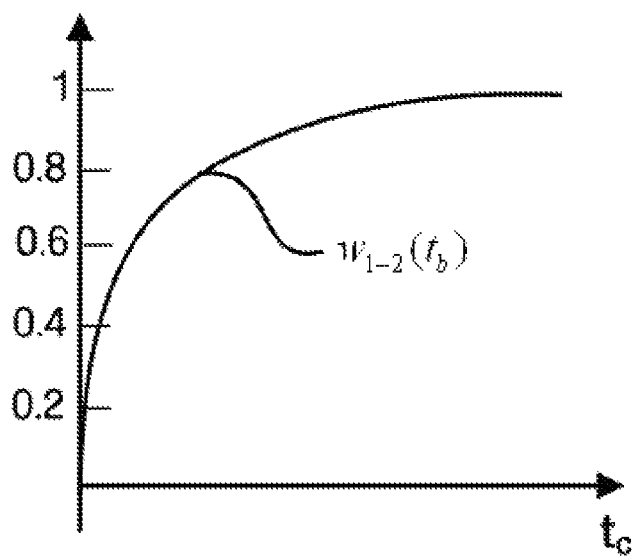

If motion of the image is controlled through the positioning unit 510, it may be affected by a large variation in the tilt angle. Here, the weight value $w_{1-1}(\dot{\gamma})$ of the information provided from the positioning unit 510, may increase if the variation $\dot{\gamma}$ of the tilt angle becomes large, for example. One example of the weight value $w_{1-1}(\dot{\gamma})$ is shown in FIG. 11A. Also, if motion of the image is controlled through the positioning unit 510, it may be affected by a long rotation time of the device 100 in a certain direction. In this case, a weight value $w_{1-2}(t_b)$ of the information provided from the positioning unit 510 may increase if the tilt time $t_b$ of the image becomes long. One example of the weight value $w_{1-2}(t_b)$ is shown in FIG. 11B.

A final weight value of the information provided from the positioning unit 510 may be obtained from the two weight values, as expressed by the following equation 5, for example.

$$w_1(\dot{\gamma}, t_b) = w_{1-1}(\dot{\gamma}) \cdot w_{1-2}(t_b) \qquad \text{Equation 5}$$

In equation 5, $w_1(\dot{\gamma}, t_b)$ is the final weight value to be obtained.

Figure 11C:
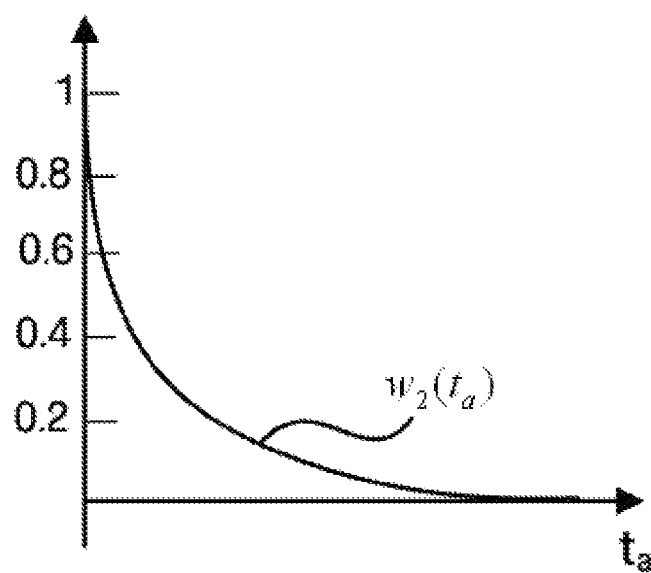

Next, if motion of the image is controlled through the restoration unit 520, it may be less affected if the time $t_a$ elapsed from the point when there is no variation in the tilt angle, i.e., the time when there is no motion of the device 100, becomes long. Accordingly, a weight value $w_2(t_a)$ of the information provided from the restoration unit 520 may decrease if the time $t_a$ becomes long. An example of the weight value $w_2(t_a)$ is shown in FIG. 11C.

Figure 11D:
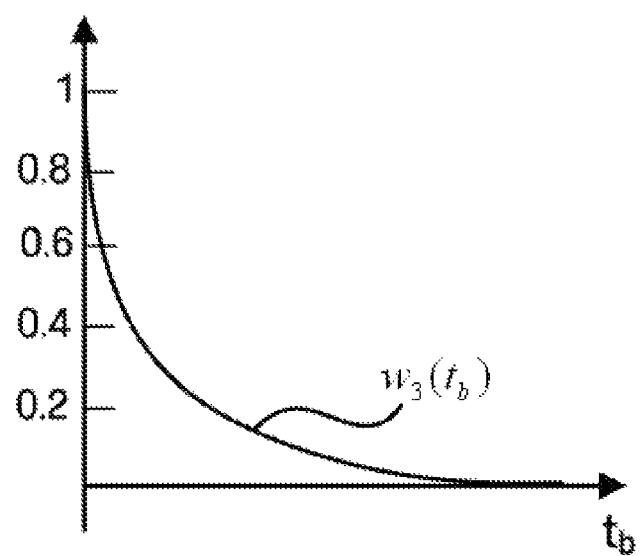

Finally, if motion of the image is controlled through the conversion unit 530, it may be less affected if the time $t_b$ elapsed from the point when the control target is converted becomes long. Accordingly, a weight value $w_3(t_b)$ of the information provided from the conversion unit 530 decreases if the time $t_b$ becomes long. An example of the weight value $w_3(t_b)$ is shown in FIG. 11D.

As described above, the control unit 540 may control the motion of the image by giving a weight value to the information provided from the positioning unit 510, the restoration unit 520 and the conversion unit 530 and synthesizing the information having each weight value. In this case, motion of the image controlled by the control unit 540 may be determined by the following equation 6, for example.

$$\theta = \frac{\sum_{i=1}^{3} w_i \cdot \theta_i}{\sum_{i=1}^{3} w_i}$$

$$= \frac{w_1(\dot{\gamma}, t_b)}{W} \cdot f_1(\gamma) + \frac{w_2(t_a)}{W} \cdot f_2(t_a, \theta_a) +$$

$$\frac{w_3(t_b)}{W} \cdot f_3(t_b)$$

Equation 6

In equation 6, θ is the intermediate angle if the concept of FIG. 6 is used, and W may be expressed by the following equation 7, for example.

$$W = w_1(\dot{\gamma}, t_b) + w_2(t_a) + w_3(t_b)$$

Equation 7

Meanwhile, the control unit 540 may control the motion of an image (hereinafter, referred to as "reference image") corresponding to the current control target and the motion of an image (hereinafter, referred to as "adjacent image") adjacent to the reference image.

Figure 12:
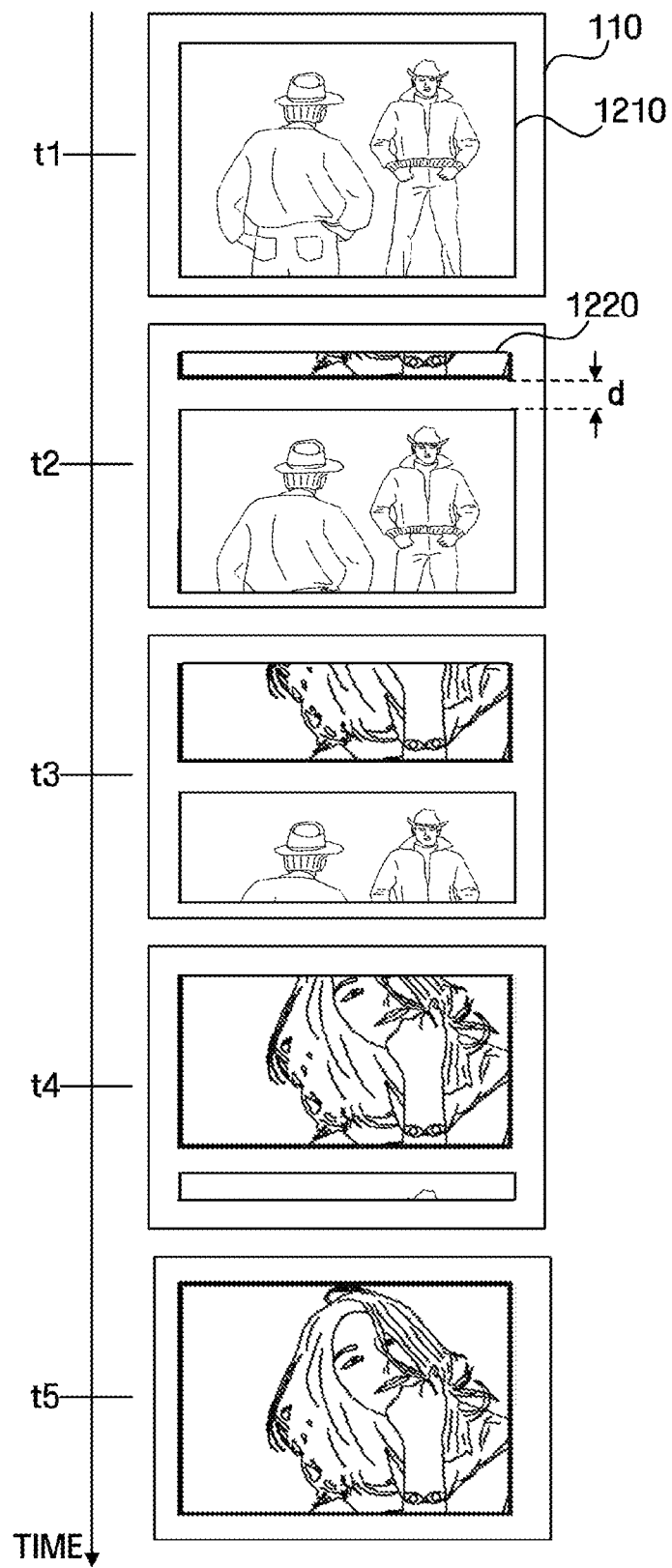
FIG. 12 illustrates browsing images, according to an embodiment of the present invention.

For example, if a space of a certain size or greater occurs on the screen 110 due to the motion of the reference image, the control unit 540 may display some area of the adjacent image, such as an edge, at a predetermined distance from the reference image. Here, the adjacent image may move identically along with the reference image while maintaining a certain distance from the reference image. In this way, the control unit 540 may control the motion of the image, and such control by the control unit 540 is shown in FIG. 12. As shown in FIG. 12, for example, if a first image 1210 corresponding to the reference image is moved to a lower end of the screen 110 by user tilting of the portable digital device 100, a space occurs at an upper end of the screen 110, where the displaced reference image was located. At this time, the control unit 540 displays a second image 1220, corresponding to the adjacent image, spaced apart from the first image 1210 at a distance d, for example (see t2). The display area of the first image 1210 is reduced and the display area of the second image 1220 increases as the first image 1210 moves to the lower end of the screen 110, and the second image 1220 moves to replace the first image 1210.

If the tilt angle of the portable digital device 100 exceeds a second threshold value, conversion of the control target occurs in t3 of FIG. 11, for example. In this case, the second image 1220 becomes the reference image, and the first image 1210 becomes the adjacent image.

If conversion of the control target occurs, the control unit 540 may gradually move the second image 1220 to the center of the screen 110, according to the information provided from the conversion unit 530 (the oscillation operation described with reference to FIG. 10 has been omitted). Here, the first image 1210, corresponding to the adjacent image, may move identically with the second image 1220 while maintaining a distance d from the second image 1220, corresponding to the reference image, whereby the second image 1220 may ultimately be positioned at the mid-point of the screen 110.

Hereinafter, the operation of the aforementioned apparatus 300 will be described with reference to FIG. 13.

Figure 13:
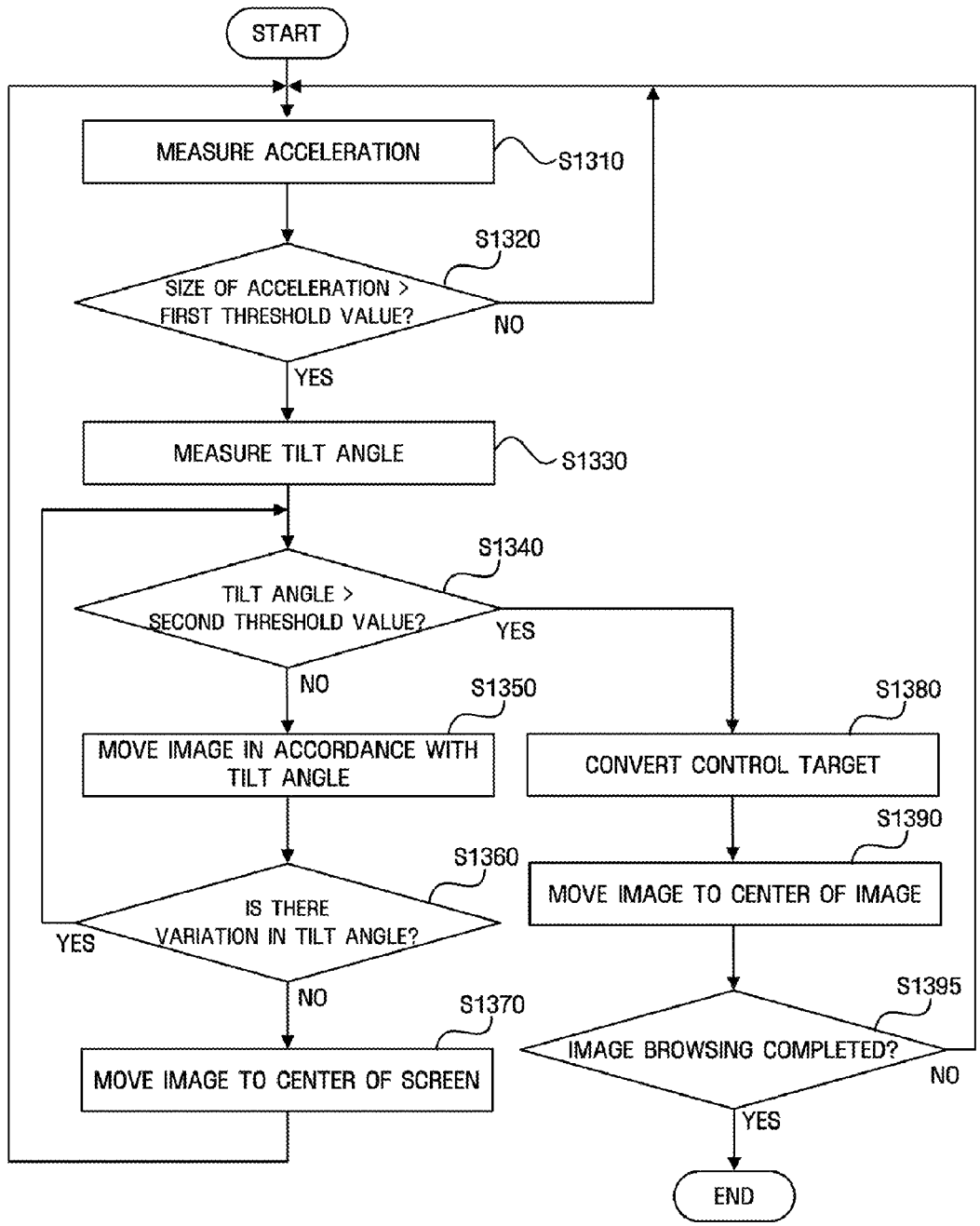
FIG. 13 illustrates browsing images, according to an embodiment of the present invention.

FIG. 13 illustrates the browsing of images, according to an embodiment of the present invention.

If the device 100 is operated in the image browsing mode, the sensor unit 310 may measure the acceleration given to the portable digital device 100, in operation S1310. As described above, the acceleration may be measured with reference to at least one reference axis.

At this time, the determination unit 320 may determine whether the size of the acceleration imparted to the portable digital device 100 exceeds a first threshold value, in operation S1320. If the size of the acceleration does not exceed the first threshold value, the motion of the portable digital device 100 may not be determined as one intended by the user for image browsing. Accordingly, the apparatus 300 need not reflect motion of the portable digital device 100 by moving the image.

However, if the size of the acceleration exceeds a first threshold value, motion of the device 100 may be determined as the user's request for image browsing. In this case, the tilt angle measurement unit 330 may measure the tilt angle of the device 100 around a predetermined reference axis, in operation S1330. The tilt angle may be obtained using acceleration information measured by the sensor unit 310 with respect to each reference axis, for example.

The screen management unit 340 may determine whether the tilt angle measured by the tilt angle measurement unit 330 exceeds a second threshold value in operation S1340. If the tilt angle does not exceed the second threshold value, the screen management unit 340 may move the image commensurate to the size of the tilt angle in operation S1350. Here, motion of the image is mainly affected by the information provided from the positioning unit 510.

Afterwards, the screen management unit 340 may determine whether there is variation in the tilt angle in operation S1360. Whether there is variation in the tilt angle may be identified by detecting whether there is variation in the acceleration sensed by the sensor unit 310, for example.

If there is no variation in the tilt angle, the screen management unit 340 may gradually move the image to the center of the screen 110 in accordance with the amount of time elapsed, for example, in operation S1370. Here, motion of the image is primarily affected by the information provided from the restoration unit 520. As a result of operation S1360, if there is a variation in the tilt angle, the current operation returns to operation S1340 to compare the varied tilt angle with the second threshold value.

Meanwhile, as a result of operation S1340, if the tilt angle is greater than the second threshold value, the screen management unit 340 may convert the control target to set the adjacent image as the reference image in operation S1380, and may move the new reference image to the center of the screen 110 in operation S1390. Here, motion of the image is mainly affected by the information provided from the conversion unit 530.

Afterwards, if an end to the image browsing is not requested in operation S1395, the current operation may return to operation S1310 to repeat the image browsing operations.

In embodiments of the present invention as described above, the term "unit", as used herein to in indicate components of the image browsing apparatus 300, may be implemented by a kind of modules. A module refers to, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example only, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

In addition to this discussion, one or more embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to one or more embodiments of the present invention. The media may also be a distributed network, so that the computer readable code is stored/transferred and executed in a distributed fashion. Still further, as only an example, the processing element may include a processor or a computer processor, and processing elements may be distributed and/or included in a single device.

As described above, the method, medium and apparatus browsing images according to one or more embodiments of the present invention has one or more of the following advantages.

First, since a user may browse the images without pressing buttons, user convenience is enhanced.

Second, in browsing the images using the tilt angle of the portable digital device, a determination unit may avoid unnecessary motion of the image caused by an unintended motion of the portable digital device.

Third, the motion of the image may be stabilized during image browsing.

Finally, since the user can feel the physical object during the image browsing, reality is enhanced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of browsing images, the method comprising:
   displaying a first image on a display area of a portable digital device;
   sensing a tilting movement of the portable digital device with respect to a reference axis;
   responsive to the sensing, panning the first image if the sensed tilting movement is between a first value and a second value, scrolling the first image displayed on the display area in a first direction if the tilting movement exceeds the second value, and displaying a beginning portion of a second image adjacent to an end portion of the first image during the scrolling in the first direction, and upon determining that a tilting movement that exceeds the first value has not been sensed for a predetermined time automatically moving either the first image or the second image to a center of the display area,
   wherein the first image is a visual representation of a first digital file, and
   the second image is a visual representation of a second digital file.

2. The method of claim 1, wherein the second image is selected among one of two images adjacent to the first image according to a direction of the tilting movement.

3. The method of claim 1, further comprising increasing a moving distance of the first image as a tilt angle increases.

4. The method of claim 1, further comprising increasing a movement velocity of the first image as a tilt angle increases.

5. The method of claim 1, further comprising increasing a movement velocity of the first image as a duration of a tilt time increases.

6. The method of claim 1, further comprising increasing a movement velocity of the first image as a change rate of a tilt angle increases.

7. The method of claim 1, further comprising determining either the first image or the second image as a reference image and moving the reference image to the center of the display area.

8. The method of claim 7, further comprising gradually moving a midpoint of the reference image towards a midpoint of the display area in accordance with a time period commenced immediately after a moment when a tilt angle is no longer changing.

9. The method of claim 7, further comprising controlling the reference image to move a midpoint of the reference image towards a midpoint of the display area, and making the midpoint of the reference image oscillate around the midpoint of the display area.

10. The method of claim 1, further comprising gradually moving a midpoint of the second image to a midpoint of the display area in accordance with a time period commencing the moment a tilt angle exceeds the threshold value.

11. The method of claim 1, further comprising moving a midpoint of the second image towards a midpoint of the display area, and making the midpoint of the second image oscillate around the midpoint of the display area.

12. An apparatus browsing images, comprising:
    a control unit to display a first image on a display area of a portable digital device;
    a tilt angle measurement unit to sense a tilting movement of the portable digital device with respect to a reference axis; and
    a screen management unit to, responsive to the sensing, pan the first image if the tilting movement exceeds a first value, scroll the first image displayed on the display area in a first direction if the tilting movement exceeds the first value, and display a beginning portion of a second image adjacent to an end portion of the first image during the scrolling in the first direction, and upon determining that a tilting movement exceeding the first value has not been sensed for a predetermined time, automatically moving either the first image or the second image to a center of the display area, wherein the first image is a visual representation of a first digital file, and the second image is a visual representation of a second digital file.

13. The apparatus of claim 12, wherein the second image is selected among one of two images adjacent to the first image according to a direction of the tilting movement.

14. The apparatus of claim 12, wherein the screen management unit increases a moving distance of the first image as a tilt angle increases.

15. The apparatus of claim 12, wherein the screen management unit increases a movement velocity of the first image as a tilt angle increases.

16. The apparatus of claim 12, wherein the screen management unit increases a movement velocity of the first image as a duration of a tilt time increases.

17. The apparatus of claim 12, wherein the screen management unit increases a movement velocity of the first image as a change rate of a tilt angle increases.

18. The apparatus of claim 12, wherein the screen management unit determines whether either the first image or the second image is a reference image and moves the reference image to the center of the display area.

19. The apparatus of claim 18, wherein the screen management unit gradually moves a midpoint of the reference image towards a midpoint of the display area in accordance with a time period commenced immediately after a moment when a tilt angle is no longer changing.

20. The apparatus of claim 18, wherein the screen management unit moves a midpoint of the reference image towards a midpoint of the display area, and moves the midpoint of the reference image in a predetermined direction around the midpoint of the display area.

21. The apparatus of claim 12, wherein the screen management unit moves a midpoint of the second image to the midpoint of the display area in accordance with a time period commencing a moment a tilt angle exceeds the second value.

22. The apparatus of claim 12, wherein the screen management unit moves a midpoint of another image towards a midpoint of the display area, while moving a midpoint of the second image in a predetermined direction around the midpoint of the display area.

* * * * *